United States Patent
Massand

(10) Patent No.: US 10,530,885 B2
(45) Date of Patent: Jan. 7, 2020

(54) SYSTEMS AND METHODS FOR A BIDIRECTIONAL MULTI-FUNCTION COMMUNICATION MODULE

(71) Applicant: Litera Corporation, McLeansville, NC (US)

(72) Inventor: Deepak Massand, McLeansville, NC (US)

(73) Assignee: LITERA CORPORATION, Chicago, IL (US)

( * ) Notice: Subject to any disclaimer, the term of this patent is extended or adjusted under 35 U.S.C. 154(b) by 0 days.

(21) Appl. No.: 15/803,985

(22) Filed: Nov. 6, 2017

(65) Prior Publication Data

US 2018/0124199 A1     May 3, 2018

Related U.S. Application Data

(63) Continuation of application No. 15/167,213, filed on May 27, 2016, now Pat. No. 9,813,519, which is a
(Continued)

(51) Int. Cl.
*H04L 29/08*     (2006.01)
*G06F 16/215*     (2019.01)
(Continued)

(52) U.S. Cl.
CPC ...... *H04L 67/2842* (2013.01); *G06F 16/1794* (2019.01); *G06F 16/215* (2019.01);
(Continued)

(58) Field of Classification Search
CPC .................................................. H04L 67/2842
(Continued)

(56) References Cited

U.S. PATENT DOCUMENTS

| 5,706,502 A | 1/1998 | Foley et al. |
| 5,940,843 A | 8/1999 | Zucknovich |

(Continued)

OTHER PUBLICATIONS

Microsoft Computer Dictionary, "bidirectional", 5th edition, 2002, p. 57 (Year: 2002).*
(Continued)

*Primary Examiner* — Ondrej C Vostal
(74) *Attorney, Agent, or Firm* — Finnegan, Henderson Farabow, Garrett & Dunner LLP

(57) ABSTRACT

Systems and methods are disclosed for bidirectional multi-function communication between a computing device and applications located at an external server. The bidirectional communications allows an operation to be performed on a file using a computing device and an external server. In one implementation, an application resides on a desktop computer that is connected to the Internet. The application sends a request to an external server accessible through the Internet using a bidirectional communication system. The server accepts and processes the request and provides data back to the computer via the same bidirectional communication system. A user may then access the data, manipulate it and provide an additional request to the server via the bidirectional communication system.

12 Claims, 6 Drawing Sheets

Related U.S. Application Data continuation of application No. 12/909,419, filed on Oct. 21, 2010, now Pat. No. 9,356,991.

(60) Provisional application No. 61/333,101, filed on May 10, 2010.

(51) Int. Cl.
*G06F 16/178* (2019.01)
*H04L 29/06* (2006.01)

(52) U.S. Cl.
CPC .............. *H04L 63/08* (2013.01); *H04L 67/06* (2013.01); *H04L 67/1021* (2013.01); *H04L 67/1097* (2013.01); *H04L 67/306* (2013.01)

(58) Field of Classification Search
USPC ......................................................... 709/219
See application file for complete search history.

(56) References Cited

U.S. PATENT DOCUMENTS

| | | | |
|---|---|---|---|
| 6,029,175 A * | 2/2000 | Chow | H04L 29/06 |
| 6,112,246 A | 8/2000 | Horbal | |
| 6,119,078 A * | 9/2000 | Kobayakawa | G06F 17/272 |
| | | | 704/3 |
| 6,161,126 A | 12/2000 | Wies et al. | |
| 6,240,444 B1 * | 5/2001 | Fin | H04L 29/06 |
| | | | 709/205 |
| 6,463,460 B1 | 10/2002 | Simonoff | |
| 6,463,578 B1 | 10/2002 | Johnson | |
| 6,477,708 B1 | 11/2002 | Sawa | |
| 6,628,413 B1 | 9/2003 | Lee | |
| 6,643,650 B1 | 11/2003 | Slaughter et al. | |
| 6,680,730 B1 | 1/2004 | Shields et al. | |
| 6,708,331 B1 | 3/2004 | Schwartz | |
| 6,738,760 B1 * | 5/2004 | Krachman | G06Q 50/16 |
| 6,792,466 B1 | 9/2004 | Saulpaugh et al. | |
| 6,799,195 B1 | 9/2004 | Thibault | |
| 6,819,339 B1 * | 11/2004 | Dowling | G06F 17/2247 |
| | | | 707/999.003 |
| 6,934,740 B1 | 8/2005 | Lawande | |
| 6,957,199 B1 | 10/2005 | Fisher | |
| 7,000,008 B2 | 2/2006 | Bautista-Lloyd | |
| 7,020,843 B2 | 3/2006 | Hamlett | |
| 7,089,259 B1 | 8/2006 | Kouznetsov et al. | |
| 7,155,504 B1 | 12/2006 | Fujieda | |
| 7,167,918 B2 * | 1/2007 | Byrne | G06F 21/6218 |
| | | | 707/999.008 |
| 7,167,982 B2 | 1/2007 | Elliott | |
| 7,181,492 B2 | 2/2007 | Wen et al. | |
| 7,249,344 B1 | 7/2007 | Zeanah | |
| 7,277,925 B2 | 10/2007 | Warnock | |
| 7,289,964 B1 | 10/2007 | Bowman-Amuah | |
| 7,299,232 B2 * | 11/2007 | Stakutis | G06F 16/1734 |
| | | | 709/229 |
| 7,325,077 B1 | 1/2008 | Nguyen | |
| 7,346,703 B2 | 3/2008 | Cope | |
| 7,370,269 B1 * | 5/2008 | Prabhu | G06F 17/30873 |
| | | | 715/201 |
| 7,425,950 B2 | 9/2008 | Ito et al. | |
| 7,536,641 B2 | 5/2009 | Rosenstein | |
| 7,580,703 B1 | 8/2009 | Veselov | |
| 7,620,719 B2 | 11/2009 | Tock et al. | |
| 7,660,902 B2 | 2/2010 | Graham et al. | |
| 7,692,807 B1 * | 4/2010 | Sanders | G06F 3/1204 |
| | | | 358/1.15 |
| 7,702,724 B1 | 4/2010 | Brydon et al. | |
| 7,734,732 B2 | 6/2010 | Soelberg | |
| 7,769,895 B1 | 8/2010 | Williams | |
| 7,774,504 B2 | 8/2010 | Chene | |
| 7,779,103 B1 * | 8/2010 | Fikes | G06F 21/6263 |
| | | | 709/219 |
| 7,779,408 B1 | 8/2010 | Papineau | |
| 7,839,987 B1 * | 11/2010 | Kirchhoff | H04M 3/42195 |
| | | | 379/142.01 |
| 7,844,675 B2 | 11/2010 | Daigle | |
| 7,890,600 B2 | 2/2011 | Hellstrom | |
| 7,941,525 B1 | 5/2011 | Yavilevich | |
| 8,032,508 B2 * | 10/2011 | Martinez | G06F 16/9535 |
| | | | 707/708 |
| 8,131,815 B1 | 3/2012 | Perelman | |
| 8,135,860 B1 * | 3/2012 | Brown | H04L 67/327 |
| | | | 709/246 |
| 8,156,146 B2 | 4/2012 | Arthursson | |
| 8,271,574 B1 | 9/2012 | Srinivasan et al. | |
| 8,271,611 B2 | 9/2012 | Husa | |
| 8,458,656 B1 | 6/2013 | Liang | |
| 8,572,561 B1 | 10/2013 | Annan, Jr. | |
| 8,676,901 B1 | 3/2014 | Nicolaou | |
| 8,725,805 B2 | 5/2014 | Rubio Andres | |
| 8,819,177 B2 | 8/2014 | Sakairi | |
| 8,825,741 B2 | 9/2014 | Mayer | |
| 8,886,822 B2 * | 11/2014 | Pedersen | H04L 67/06 |
| | | | 709/231 |
| 9,356,991 B2 * | 5/2016 | Massand | H04L 63/08 |
| 9,813,519 B2 | 11/2017 | Massand | |
| 2001/0019336 A1 | 9/2001 | Gordon et al. | |
| 2002/0023268 A1 | 2/2002 | LaRocca et al. | |
| 2002/0065911 A1 | 5/2002 | von Klopp | |
| 2002/0069296 A1 * | 6/2002 | Aua | H04L 29/06 |
| | | | 709/246 |
| 2002/0083154 A1 | 6/2002 | Auffray | |
| 2002/0087620 A1 | 7/2002 | Rouse | |
| 2002/0091798 A1 * | 7/2002 | Joshi | G06F 21/62 |
| | | | 709/219 |
| 2002/0097408 A1 * | 7/2002 | Chang | G06F 3/1245 |
| | | | 358/1.6 |
| 2002/0099738 A1 | 7/2002 | Grant | |
| 2002/0138557 A1 * | 9/2002 | Mukaiyama | G06F 3/1204 |
| | | | 709/203 |
| 2002/0152239 A1 | 10/2002 | Bautista-Lloyd | |
| 2002/0174010 A1 | 11/2002 | Rice, III | |
| 2003/0018827 A1 | 1/2003 | Guthrie | |
| 2003/0023628 A1 | 1/2003 | Girardot | |
| 2003/0086542 A1 * | 5/2003 | Urien | H04L 29/06 |
| | | | 379/93.01 |
| 2003/0131041 A1 | 7/2003 | Dinker | |
| 2003/0135358 A1 | 7/2003 | Lissauer | |
| 2003/0140121 A1 | 7/2003 | Adams | |
| 2003/0217363 A1 | 11/2003 | Brady, Jr. | |
| 2004/0012630 A1 * | 1/2004 | Carels | G06F 8/34 |
| | | | 715/760 |
| 2004/0046789 A1 | 3/2004 | Inanoria | |
| 2004/0064501 A1 | 4/2004 | Jan | |
| 2004/0111729 A1 | 6/2004 | Moore | |
| 2004/0117804 A1 | 6/2004 | Scahill | |
| 2004/0158617 A1 | 8/2004 | Shanny | |
| 2004/0250203 A1 | 12/2004 | Yamada | |
| 2004/0261010 A1 | 12/2004 | Matsuishi | |
| 2005/0004885 A1 | 1/2005 | Pandian et al. | |
| 2005/0005099 A1 | 1/2005 | Naruse | |
| 2005/0010764 A1 | 1/2005 | Collet et al. | |
| 2005/0014494 A1 | 1/2005 | Owen | |
| 2005/0021876 A1 | 1/2005 | Asai | |
| 2005/0044183 A1 | 2/2005 | Meunier | |
| 2005/0044188 A1 | 2/2005 | Nakazawa et al. | |
| 2005/0050164 A1 * | 3/2005 | Burd | G06F 9/451 |
| | | | 709/217 |
| 2005/0132284 A1 * | 6/2005 | Lloyd | G06F 17/211 |
| | | | 715/236 |
| 2005/0144259 A1 | 6/2005 | Buckley | |
| 2005/0198365 A1 | 9/2005 | Wei | |
| 2005/0246283 A1 | 11/2005 | Gwiazda et al. | |
| 2005/0262549 A1 | 11/2005 | Ritt et al. | |
| 2005/0282533 A1 | 12/2005 | Draluk | |
| 2006/0000904 A1 | 1/2006 | Vernay et al. | |
| 2006/0015649 A1 | 1/2006 | Zutaut et al. | |
| 2006/0017954 A1 | 1/2006 | Ly et al. | |
| 2006/0031428 A1 | 2/2006 | Wikman | |
| 2006/0049922 A1 | 3/2006 | Kolpasky | |
| 2006/0075070 A1 | 4/2006 | Merissert-Coffinieres | |

(56) References Cited

U.S. PATENT DOCUMENTS

| | | |
|---|---|---|
| 2006/0123109 A1 | 6/2006 | Laforge |
| 2006/0235611 A1 | 10/2006 | Deaton et al. |
| 2006/0251258 A1 | 11/2006 | Lillie et al. |
| 2006/0259544 A1 | 11/2006 | Zubenko |
| 2006/0282521 A1 | 12/2006 | Anderson |
| 2006/0288084 A1* | 12/2006 | Nguyen ............ G06F 17/30905 709/217 |
| 2007/0033264 A1 | 2/2007 | Edge et al. |
| 2007/0061488 A1 | 3/2007 | Alagappan et al. |
| 2007/0116036 A1 | 5/2007 | Moore |
| 2007/0130166 A1 | 6/2007 | Takahashi |
| 2007/0136302 A1 | 6/2007 | Zuber |
| 2007/0143444 A1 | 6/2007 | Kamiya |
| 2007/0150299 A1 | 6/2007 | Flory |
| 2007/0226314 A1 | 9/2007 | Eick |
| 2008/0005669 A1* | 1/2008 | Eilertsen ............... G11B 27/034 715/210 |
| 2008/0040488 A1 | 2/2008 | Gupta |
| 2008/0046557 A1 | 2/2008 | Cheng |
| 2008/0055659 A1* | 3/2008 | Uchida .............. H04N 1/00212 358/400 |
| 2008/0120539 A1* | 5/2008 | Stephens, Jr. ........... G06F 17/24 715/256 |
| 2008/0148193 A1* | 6/2008 | Moetteli ............... G06F 16/954 715/854 |
| 2008/0221936 A1* | 9/2008 | Patterson ............... G06Q 10/10 705/4 |
| 2008/0228867 A1* | 9/2008 | Murphy ............ G06F 17/30194 709/203 |
| 2008/0250115 A1 | 10/2008 | Iyer |
| 2008/0282175 A1 | 11/2008 | Costin |
| 2008/0294584 A1 | 11/2008 | Herz |
| 2008/0301102 A1 | 12/2008 | Liang |
| 2009/0088192 A1 | 4/2009 | Davis et al. |
| 2009/0106769 A1 | 4/2009 | Nakamura |
| 2009/0119678 A1 | 5/2009 | Shih |
| 2009/0144398 A1 | 6/2009 | Reisman |
| 2009/0164606 A1 | 6/2009 | Epifania |
| 2009/0199230 A1 | 8/2009 | Kumar |
| 2009/0249222 A1 | 10/2009 | Schmidt et al. |
| 2009/0254610 A1 | 10/2009 | Arthursson |
| 2009/0265766 A1 | 10/2009 | Mansell |
| 2009/0287646 A1 | 11/2009 | Maciocci |
| 2009/0300110 A1 | 12/2009 | Chene |
| 2010/0023927 A1 | 1/2010 | Yang |
| 2010/0046553 A1 | 2/2010 | Daigle |
| 2010/0058171 A1 | 3/2010 | Tsai |
| 2010/0063892 A1 | 3/2010 | Keranen |
| 2010/0082747 A1 | 4/2010 | Yue |
| 2010/0082769 A1 | 4/2010 | Bertin |
| 2010/0114823 A1 | 5/2010 | Sykes et al. |
| 2010/0114864 A1 | 5/2010 | Agam et al. |
| 2010/0121969 A1* | 5/2010 | Levitan .................. H04L 45/38 709/231 |
| 2010/0122188 A1 | 5/2010 | Brun |
| 2010/0146383 A1 | 6/2010 | Kim et al. |
| 2010/0146483 A1 | 6/2010 | Komarov |
| 2010/0153566 A1 | 6/2010 | Sheleheda et al. |
| 2010/0167687 A1 | 7/2010 | Morrey |
| 2010/0169500 A1* | 7/2010 | Quigley ............ G06F 17/30194 709/229 |
| 2010/0174826 A1 | 7/2010 | Sharma |
| 2010/0190478 A1 | 7/2010 | Brewer |
| 2010/0205239 A1 | 8/2010 | Greiner |
| 2010/0208302 A1 | 8/2010 | Lee |
| 2010/0257451 A1 | 10/2010 | Halevi |
| 2010/0281085 A1* | 11/2010 | Araumi ................. G06Q 10/10 707/827 |
| 2010/0306366 A1 | 12/2010 | Cragun |
| 2011/0029879 A1 | 2/2011 | Calvin |
| 2011/0072425 A1 | 3/2011 | Lemonnier |
| 2011/0096174 A1 | 4/2011 | King |
| 2011/0105090 A1* | 5/2011 | Shackleton ........ G06Q 20/3224 455/414.1 |
| 2011/0154462 A1 | 6/2011 | Charbonnier |
| 2011/0183651 A1 | 7/2011 | Mundy |
| 2011/0238712 A1 | 9/2011 | Dostal |
| 2011/0254792 A1 | 10/2011 | Waters et al. |
| 2011/0263296 A1 | 10/2011 | Baietto et al. |
| 2012/0016966 A1 | 1/2012 | Jodlauk et al. |
| 2012/0137281 A1 | 5/2012 | Kleiner |

OTHER PUBLICATIONS

Appelt, "WWW Based Collaboration with the BSCW System," 1999.

Avvenuti et al. "On-demand loading of pervasive-oriented applications using mass-market camera phones" 2006.

Behr et al., "PHPMyWMS—an Open Source based SVG oriented Framework for extended Web Map Services" 2006.

Christ et al., "Chapter 4 SW-Architecture for Device Independent Mobile Learning" 2010.

Marsic et al., "An Application Framework for Synchronous Collaboration using Java Beans", 1999.

McKinley et al., "Pavilion: A Middleware Framework for Collaborative Web-based Applications", 1999.

Microsoft Computer Dictionary, "format", "formatting", 2002.

Microsoft Computer Dictionary, "transform", 2002.

Microsoft Computer Dictionary, cover page, 2002.

PC magazine, "widget", 2016.

Sanyal et al., "Chapter 13 A Multifactor Secure Authentication System for Wireless Payment" 2010.

Sun Microsystems Inc., "JavaCard 2.2 Runtime Environment (JCRE) Specification", 2002.

Sun Microsystems, "Over The Air User Initiated Provisioning Recommended Practice for the Mobile Information Device Profile Version 1.0", 2001.

Trevor et al., "NetaWeb: Bringing synchronous groupware to the World Wide Web", 1997.

Whatis, "widget", 2016.

Zweije, "Remote X Apps mini-HOWTO", 2001.

Amendment in Response to Non-Final Office Action dated Feb. 14, 2019, Reexam Control No. 90/014,157.

Declaration of Robin Glover, Statement Under 35 U.S.C. 301, dated Jul. 30, 2018, Reexam Control No. 90/014,157.

Non-Final Office Action dated Nov. 14, 2018, Reexam Control No. 90/014,157.

The Order Granting Reexamination dated Jul. 25, 2018 of U.S. Pat. No. 9,813,519.

Request for Ex Parte Reexamination of U.S. Pat. No. 9,813,519, filed Jun. 26, 2018.

Workshare Compare Service Administration Guide, © 2007, cited in Reexamination Control No. 90/014,157.

Workshare Compare Service Developers Guide, © 2007, cited in Reexamination Control No. 90/014,157.

Workshare Launches Compare Service—First Web Services Version of Gold Standard Deltaview, cited in Reexamination Control No. 90/014,157.

Workshare DeltaServer Configuration Guide, © 2003, cited in Reexamination Control No. 90/014,157.

Workshare Compare Service Technical Quick Start Guide, © 2007, cited in Reexamination Control No. 90/014,157.

Workshare, Ltd. Workshare Launches Compare Service—First Web Services Version of Gold Standard DeltaView Document Comparison Tool. Workshare, Ltd. All Pages. Nov. 17, 2005.†

Workshare, Ltd. Workshare DeltaServer Configuration Guide, Workshare Ltd. All pages. 2003.†

Workshare, Ltd. Workshare Compare Service Developers Guide, Workshare Ltd. All pages. 2007.†

Workshare, Ltd. Workshare Compare Service Administration Guide, Workshare Ltd. All pages. 2007.†

\* cited by examiner
† cited by third party

SYSTEMS AND METHODS FOR A BIDIRECTIONAL MULTI-FUNCTION COMMUNICATION MODULE

RELATED APPLICATIONS

This application is a continuation of U.S. patent application Ser. No. 15/167,213, filed May 27, 2016, which is a continuation of U.S. patent application Ser. No. 12/909,419, filed Oct. 21, 2010, which claims priority from U.S. Provisional Application Ser. No. 61/333,101, filed May 10, 2010, the disclosures of which are expressly incorporated by reference herein in their entirety.

TECHNICAL FIELD

This disclosure generally relates to computer system applications and more particularly, to methods and systems that provide bidirectional communications with remote software through an intermediary software mini-application located on a user computing device, such as a desktop system.

BACKGROUND

The installation and use of desktop-based software programs, such as Microsoft Office®, Adobe® Acrobat®, Dreamweaver®, Autodesk® and many other document lifecycle software programs, has become commonplace in business and personal applications. While these products, referred to herein as parent programs, provide users with many useful functionalities, the potential for additional features has led to the development of third party products that enhance the capabilities of the document lifecycle software programs. These third party products were developed and designed to integrate with the parent programs to provide additional features that compliment those of the parent program and include products that compare documents, remove metadata from documents, convert an electronic document to PDF, convert a PDF document back to a word processing document or a spread sheet, edit PDF documents, assist with the numbering of documents created in word processing programs, add document identification stamps, or take screenshots of regions or selected areas of computer screens.

While these software programs allow users to perform tasks more efficiently, each desktop-installed software program demands a certain amount of computing resources. In addition, certain desktop-installed software programs may create a resource or usage conflict with other existing desktop-installed software programs. This may occur when one program attempts to integrate with another program or when two programs attempt to use the same integration point to integrate with a third program.

Further, integration of multiple products may cause a parent program to slow down during initial start-up while integrated products load. A third-party product integrated into a parent program is often referred to as an "add-in" and often results in the addition of an icon on the parent program's toolbar to activate the third-party product. These additional icons may take up valuable screen space.

A desire to access computer software products from any computer at any location has led to cloud computing as an alternative for organizations and individuals seeking new ways to manage and access multiple software programs. Also referred to as Software-as-a-Service (SaaS), cloud computing is Internet-based computing, where computers and other devices access hosted software applications in an on-demand scenario. Users log into or otherwise access a cloud computing software program through an Internet-connected interface, for example an Internet browser, and access the full resources of the cloud computing software through this Internet-connected interface.

Cloud computing frees computing resources at the user's local computing device and eliminates problems with integrating third party software applications by liberating users from the need to install the application and run it on their electronic computing device. Examples of cloud computing software include the sales management solution, SalesForce.com®, and the document management solution, NetDocuments™. These products have established robust software solutions located on external servers and are available to users through the Internet without desktop installation requirements.

Several issues with the cloud computing model have limited its full adoption. First, users accustomed to the desktop-installed software model are not yet fully comfortable with the cloud computing model, which requires visiting an Internet location to access a software program rather than simply accessing that software program directly through the user's desktop. Second, while cloud computing software programs may display results of computer processing requests, they do not always have the ability to enable further editing of those results or manipulation of preferences or settings at the cloud level. This limits a user's interactivity with such programs. Finally, requiring an Internet connection in order to access software programs for users unaccustomed to such requirements and an inability to access some or all functions of a software program in the absence of Internet connectivity may cause users to become frustrated and unwilling to adopt the cloud computing model.

A need exists for a product that allows for the advantages provided by the cloud computing model but does not remove advantages of desktop applications. Currently available products do not provide the right methodology to meet these needs.

A desktop widget is a small application located on a user's desktop. A desktop widget takes up minimal computer resources while still providing information to a user. Desktop widgets give users the ability to view discrete and pre-published information from particular data sources, located either on a computer workstation or at an external location. Desktop widgets traditionally provide unidirectional personalized information after receiving a user's predetermined preferences. For example, a weather widget asks the user to choose which city's weather they wish to view. After receiving that choice the widget is unidirectional and only brings back pre-published weather forecast information for the chosen city from an external source, such as Weather.com.

FIG. 1A is a diagram providing a prior art example of the workflow relationship associated with traditional widget applications. In FIG. 1A, user 102 receives data from widget 104 that is located on desktop computer 106. The data is delivered to the user from the external server, for example, a cloud computer software program executing on external server 108, through widget 104 installed on desktop computer 106. As shown in FIG. 1A, data is passed unidirectionally and for one specific function, starting at external server 108 and ending at user 102.

Because widgets provide a single-function and serve only a simple defined purpose, the level of interaction between a user and such a resource is limited. For example, there is no widget that can compare documents or convert a word processing document to PDF or a PDF document to a word processing document. While a user can define predetermined settings and other parameters of their relationship with the widget application, only pre-published information is pulled from an external source (e.g., a blog online, a clock residing on a computer application) and then presented to the user for viewing via the widget graphical user interface (GUI).

SUMMARY

Disclosed embodiments provide a bidirectional multi-function mini-application with the capacity to integrate local client applications and a cloud-based computer software program. This mini-application is hereby referred to as the bidirectional multi-function communication module (BMCM). The BMCM maintains distinct differences from widgets by providing bidirectional communication between (1) the user, (2) the client application, and (3) the external source. Users engage with the server by requesting processing at a detailed level through the BMCM on their desktop or other local computing device. The requests, which may include processing performing an operation on one or more files or performing one or more tasks, are then sent through the BMCM to the external server, where the processing occurs. The external server returns the resulting documents, files, requests, responses, or other outputs to the user via the BMCM or via other mechanisms of communication.

Disclosed embodiments of a BMCM solution may mirror the capability provided in desktop applications, such as comparing documents, cleaning metadata, converting documents to PDF, extracting PDF documents to word processing documents or spread sheets, or performing other capabilities. Disclosed embodiments may also provide the ability to modify preferences and settings indicating how information is processed or presented and the ability to send new documents or requirements back to the external server application for additional processing. These features may be provided without the drawbacks of having to install a desktop application, such as integration problems, upgrading software on multiple computing devices, and usage of computing device resources. In addition, disclosed embodiments may also eliminate the need for users to visit a Web site to access cloud computing functionality. A BMCM may enable users to work on their desktop computer or other computing device, with the BMCM managing all processing between the user and the cloud computing software application, including submitting and receiving data and requests.

Consistent with disclosed embodiments, a system is provided for performing an operation on a file using a local computing device and an application on an external server. The system may include a processor and a memory. The memory may include instructions that cause the processor to receive a request at the local computing device to perform an operation on a first file and to receive the first file. The memory may further include instructions that may cause the processor to format the request and the first file so that the request can be interpreted by an application on an external server. The processor may send the request and the first file to the external server. The external server may perform the operation on the first file and create a response that includes a second file. The processor may receive the response and the second file created by the external server.

Consistent with other disclosed embodiments, a method is provided for performing an operation on a file using a local computing device and an application on an external server. The method may include receiving a first file and request from the local computing device to perform an operation on the first file. The method may further include performing the operation on the first file, resulting in the creation of a second file. The method may further include sending a response that includes the second file to the local computing device.

Consistent with other disclosed embodiments, tangible computer-readable storage media may store program instructions that are executable by a processor to implement any of the methods, disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the disclosed principles. In the drawings.

DESCRIPTION OF THE EMBODIMENTS

Disclosed embodiments may enable users to manage preferences and settings for performing an operation on a file using a cloud computing software program through the BMCM, as opposed to being required to visit and log in to an Internet location. Disclosed embodiments may also provide for the transmittal of documents and other information through the BMCM to one or more cloud locations for processing and then deliver those processed documents to the user. The user may receive the processed documents either as saved files in a desktop location, via email, or as hyperlinked files. Thus, the processed documents can easily be opened and manipulated in a native desktop-based software program, including word processing programs such as Microsoft Word, spreadsheet programs such as Excel, and other programs such as PowerPoint or Adobe Acrobat. Disclosed embodiments may also provide for offline modes, in which users can access limited functionality and store processing requests within the BMCM for full processing at a later date or time when the user's electronic computing device connects with the Internet.

Reference will now be made in detail to exemplary embodiments, examples of which are illustrated in the accompanying drawings. One of ordinary skill in the art will recognize that the disclosed embodiments can be modified in various respects, all without departing from the spirit and scope of this disclosure. Accordingly, the drawings and descriptions are to be regarded as illustrative in nature, and not as restrictive. Wherever convenient, the same reference numbers will be used throughout the drawings to refer to the same or like parts.

Figure 1A:
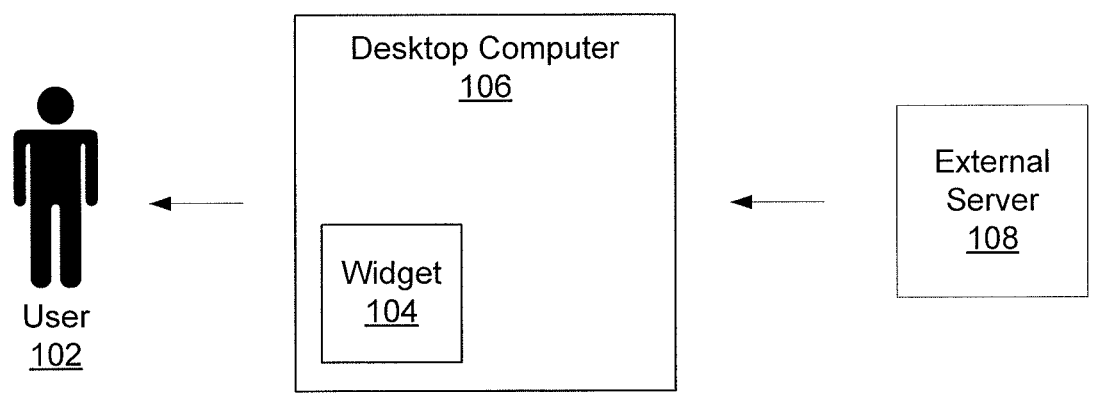
FIG. 1A is a diagram providing a prior art example of the workflow relationship associated with a widget application.
Figure 1B:
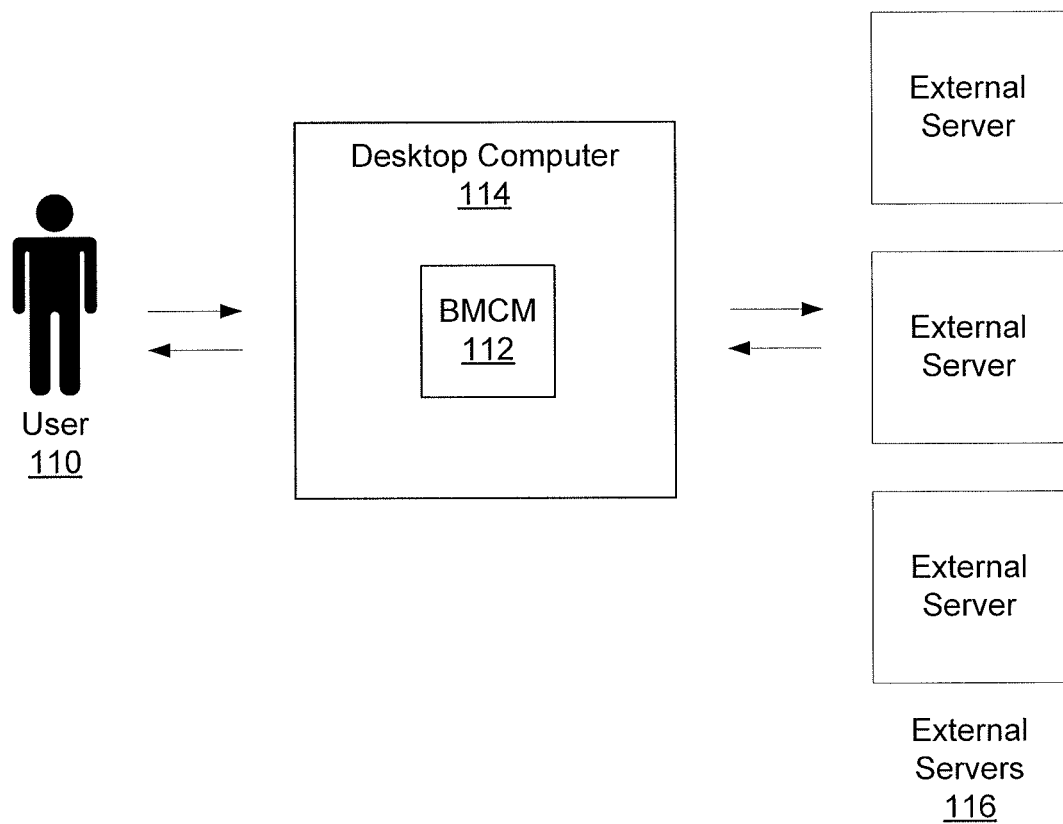
FIG. 1B is a diagram providing an example of a bidirectional multi-functional communication module and its multidirectional relationship with external services, consistent with certain disclosed embodiments.

FIG. 1B is a diagram providing an example of a bidirectional multi-functional communication module and its multidirectional relationship with external services, consistent with disclosed embodiments. In the example of FIG. 1B, BMCM 112, located on desktop computer 114, may receive requests submitted by user 110. While FIG. 1B shows BMCM 112 installed on a desktop computer disclosed embodiments are not limited to desktop computers. BMCM 112 may be installed on other user electronic devices, such as smart phones, laptop computers, or netbook computers. The user requests may include an instruction to perform an operation on an identified file, such as a request to remove metadata from a word processing document or a request to compare two spreadsheets. BMCM 112 may send the requests, and any data or files needed to execute the request, to external servers 116. In certain embodiments BMCM 112 relies on components of external server 116 to perform the operations, resulting in a small installation footprint and on the user device. External servers 116 may be part of one subsystem or may be independent from each other. If independent from each other, external servers 116 may communicate with each other over a network, such as the Internet. External servers 116 may process the requests and send the requested data back to user 110 via BMCM 112. In some embodiments, data may be returned from external servers 116 via BMCM 112 for user 110 to access and manipulate in native software. For example, the requested data may be a cleansed version of a word processing document or a spreadsheet showing insertions and deletions and external servers 116 may provide BMCM 112 with the cleansed document or the spreadsheet. User 110 may modify or save these files once received from BMCM 112. This provides a bidirectional relationship in which data is presented and requests are made on both sides of the relationship model.

Figure 1C:
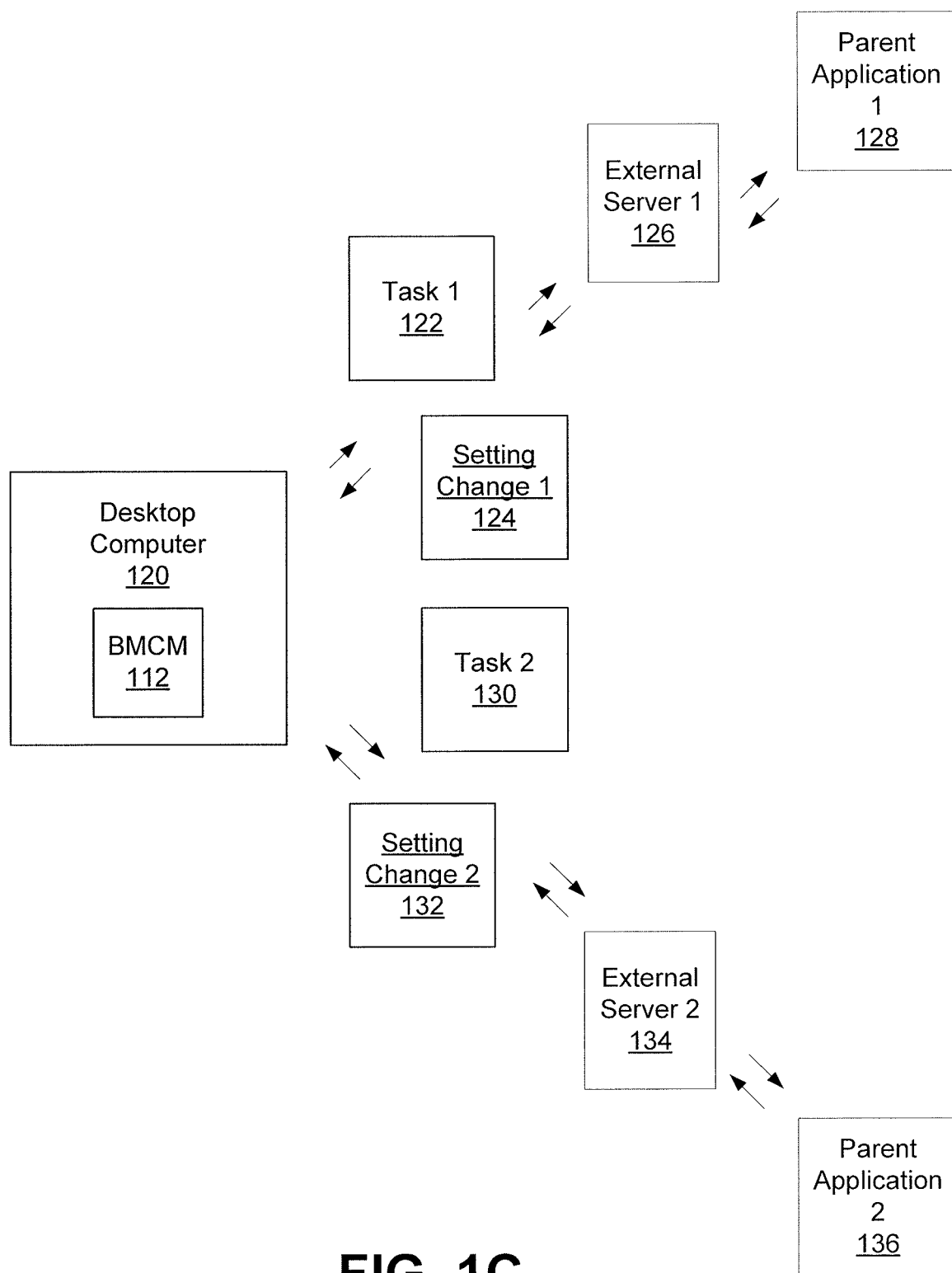
FIG. 1C is a diagram providing an example of the workflow relationship associated with the bidirectional multi-functional communication module, consistent with certain disclosed embodiments.

FIG. 1C is a diagram providing an example of the workflow relationship associated with the bidirectional multi-functional communication module, consistent with disclosed embodiments. FIG. 1C shows an example of the method by which BMCM 112 may send and receive multiple tasks and other processes to multiple parent applications via external servers. In this example, BMCM 112, located on a desktop computer 120, may send Task 1 (122) and Setting Change Request 1 (124) through External Server 1 (126) to Parent Application 1 (128). This parent application may be one of many, such as document comparison, metadata removal, screen capture, litigation document support, or PDF manipulation software. Parent Application 1 (128) may receive tasks and/or setting change requests, such as 122 and 124. Parent Application 1 (128) may process the tasks according to any settings requested, such as Setting Change 1 (124), and send the result, via the same communications channel, to BMCM 112 on desktop computer 120. Because BMCM 112 allows bidirectional communication, the process of task definition, settings management, or other application management tasks, may take place either at BMCM 112 or at the parent application. This process of communication may be repeated multiple times.

FIG. 1C presents a second example in which BMCM 112, located on a desktop computer 120, may submit Task 2 (130) and Setting Change 2 (132) through External Server 2 (134) to Parent Application 2 (136). As with Parent Application 1 (128), Parent Application 2 may perform Task 2 according to Setting Change 2 and send data back to BMCM 112. In certain embodiments BMCM 112 may sense server status. For example, if external Server 2 is down, BMCM 112 may sense that Server 2 is unavailable and, therefore, send a request to Server 1 instead. In other embodiments, BMCM 112 may determine the location of the different servers and give priority to servers in closer proximity priority.

Figure 2:
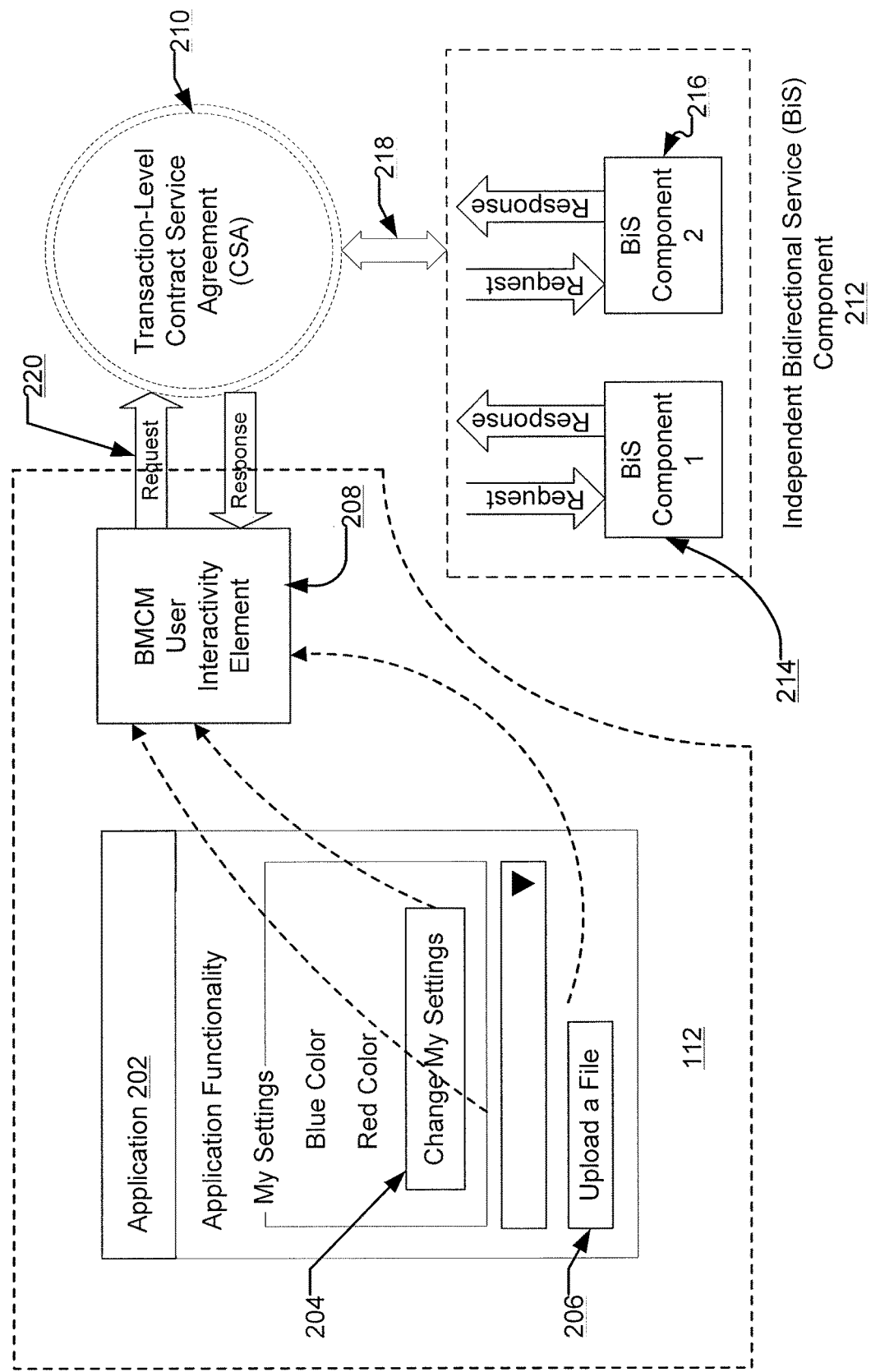
FIG. 2 is a diagram presenting an overview of the components of a BMCM and a method by which it provides bidirectional multi-functional communication between a user and an external server, consistent with certain disclosed embodiments.

FIG. 2 presents an overview of the components of an embodiment of a BMCM and demonstrates how a BMCM may provide bidirectional communication between a user and an external server to enable operations of one or more files, consistent with disclosed embodiments. Disclosed embodiments of a BMCM may expand standard cloud computing services and widget architectures through use of bidirectional multi-function service (BiS) components that exist independently and outside of core client applications, such as document processing programs. In disclosed embodiments, bidirectional information/data exchanges between the BMCM and BiS components may occur through a Communication Layer (CL). The Communication Layer enables exchanges between BMCM components and outside programs, applications, and/or components. This communication process is made up of a series of transactions between the BiS and the BMCM enabled by a transaction-level contract service agreement (CSA). The CSA is the communication standard that establishes measures by which external components, programs, or applications using the BMCM can access BiS components. Bidirectional exchanges occur at this layer and the CSA may control access to BiS components through authentication of a user's account.

In this particular embodiment, BMCM 112 contains two potential actions for an application: change settings (204) and upload a file (206). For example, application 202 may represent a request to remove metadata from a file, a request to compare two documents, a request to turn a document into a PDF document, a request to translate a document, or a request to add a signature to a document. Application 202 may also initiate a request representing a change to the settings applied to one of these other requests. A file may be the object of the request and be uploaded when a user selects the file using button 206. Some requests, such as a document comparison, may require two or more uploaded files. In some embodiments, selection of action 204, action 206, or both may submit the action with any associated files to BMCM User Interactivity Element 208, which may be a component of BMCM 122. Element 208 may format the submitted action into a request format that can be recognized by an external server. The request may be either a request for setting changes, a request to perform an operation on one or more files that have been uploaded, or both.

After formatting the request, element 208 may send the request to the external server via an Internet connection through Transaction-level Contract Service Agreement (CSA) 210. CSA 210 is a protocol by which disclosed embodiments may authorize a request and communicate with and pass on requests to the external server. Authorization may be accomplished through use of a user account having a login and password. In certain embodiments, CSA 210 resides on the user's computing system as part of BMCM 112. In such embodiments, CSA 210 may connect to authorization databases on a server to obtain an authorization code. CSA 210 may add the authorization code to the request, thus authenticating the request. CSA 210 may then use communication layer 218 to communicate the request to Independent Bidirectional Service (BiS) component 212. In other embodiments, CSA 210 may reside on an external server in communication with BiS 212. In such embodiments, element 208 may incorporate in the request user data needed to authenticate the request and may use communication layer 220 to send the request, including the user data, to CSA 210. After receiving the request from BMCM 112, CSA 210 may use the user data to authenticate the request before forwarding the request to BiS 212.

Communications between BMCM 112 and BiS component 212 may be based on industry standard XML definitions. In certain embodiments where CSA 210 resides on the user's computer system, this communication may occur through communication layer 218 using standard HTTP transport protocol using Representational State Transfer (REST) and/or Simple Object Access Protocol (SOAP) methods (protocols for Accessing Remote Objects), in which each unique transaction represents either a request or a response. The disclosed embodiments may use both push and pull based communication. In certain embodiments the REST and/or SOAP communications may be encrypted for security purposes. In other embodiments where CSA 210 resides on a server, the communication between BMCM 112 and BiS component 212 may occur in the same way through communication layer 220.

As discussed in more detail below with regard to FIG. 3, if BMCM 112 does not detect a connection to the Internet it may store the request until BMCM 112 is connected to the Internet. When connected to the Internet, BMCM 112 may use CSA 210 to integrate and communicate user requests in real time with an external server housing BiS component 212 server. In this manner, the system may provide full application interactivity to the user outside of existing standards for cloud computing architectures.

Once CSA 210 authenticates a request, CSA 210 may submit the request to Independent Bidirectional Service (BiS) component 212. BiS component 212 acts as the request processing center located at an external server. BiS component 212 may include one or more components that process requests received from CSA 210. Each component, such as component 214 may have the ability to process several different requests from several different BMCMs. Alternatively, component 214 may only process one kind of request from various BMCMs, such as a request for removing metadata, and component 216 may only process a different kind of request, such as a request to compare two documents, from the various BMCMs. In disclosed embodiments, BiS component 212 may submit a response back to CSA 210, which in turn may pass the response to BMCM User Interactivity Element 208. Responses may include a file cleansed of metadata, a marked-up document showing changes between two uploaded documents, or confirmation of a change in settings. Once a response is received at BMCM 112, a user may open, access and otherwise manipulate the file or setting sent as the response. In some embodiments BMCM 112 may allow a user to save a response directly into a document management system. A document management system is used to track and store electronic files and metadata associated with the files.

Figure 3:
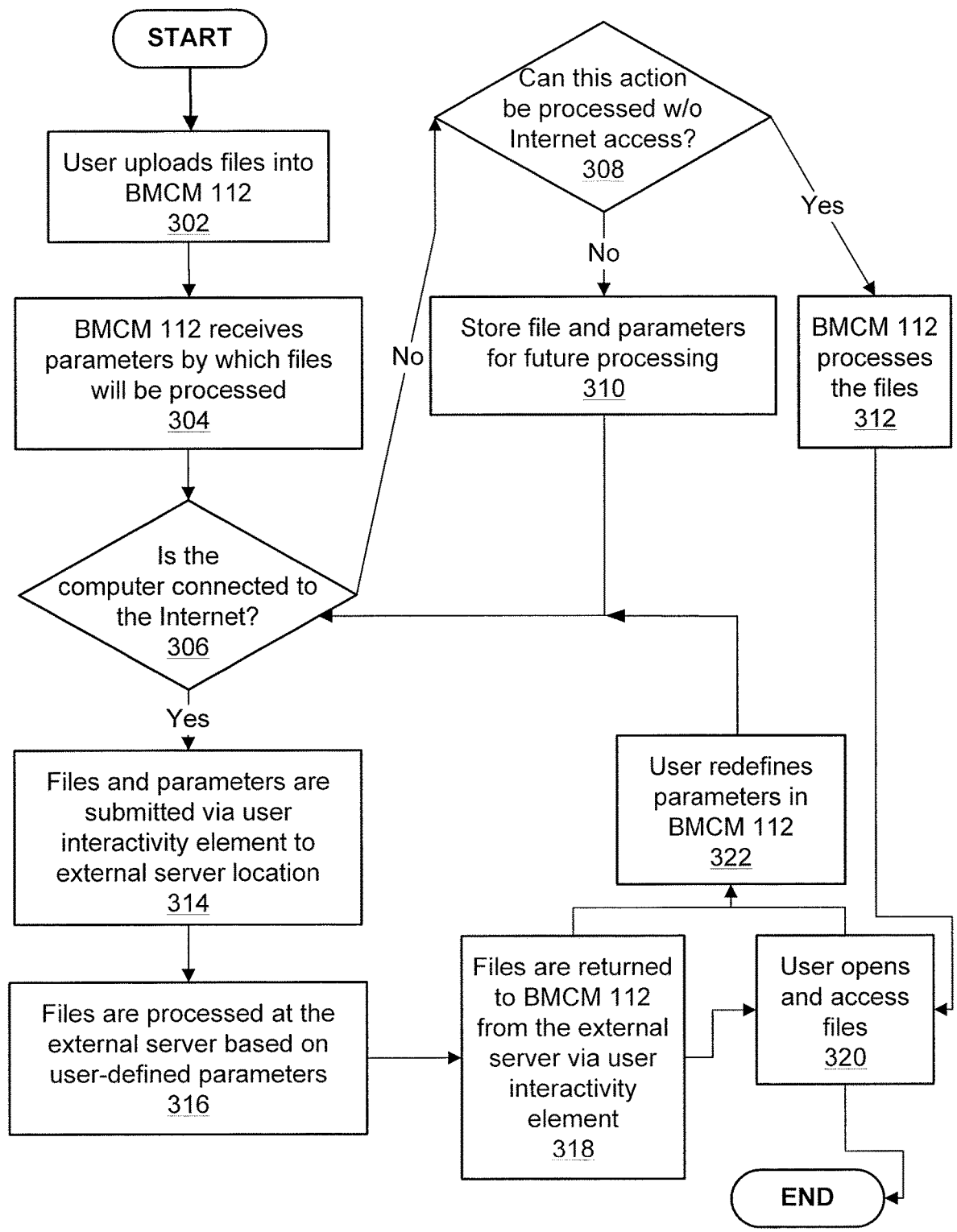
FIG. 3 is a flow diagram of an exemplary process by which bidirectional communication occurs between a local computing device and cloud computing software programs via the bidirectional multi-functional communication module interface, consistent with certain disclosed embodiments.

FIG. 3 is a flow diagram of an exemplary process by which bidirectional communication occurs between a local computing device and cloud computing software programs via the BMCM 112 interface. In Step 302, the user uploads a file into BMCM 112. Such an action can be accomplished in multiple ways, such as dragging a file into BMCM 112 or selecting a browse button in the BMCM 112 user interface and navigating to the location of a file in a local or network location. In Step 304, BMCM 112 may receive the parameters by which the file (or files) will be processed. An example of a parameter definition may include a request for metadata removal and a definition of the types of metadata to remove. Alternatively, a parameter definition may include a request to compare two documents and a definition of how the inserted and deleted text should appear, such as red inserted text and blue-strikethrough deleted text.

In Step 306, BMCM 112 may check to see if the computer is connected to the Internet. If so, the parameters and any uploaded files may be transmitted to the external server location via the communication layer, as shown in Step 314. The external server may then process the file, based on the user-defined parameters at Step 316. At Step 318, the external server may return files to BMCM 112 and, at Step 320, the user may open or otherwise access the file from BMCM 112. In certain embodiments the user may save the file to a document management system. In Step 322, BMCM 112 may receive input that redefines the parameters by which the file is processed and/or may receive input that redefines the task for processing. For example, a user may wish to change the appearance of inserted text, or may wish to perform metadata removal on the resulting document. If so, in Step 322, a request may be resubmitted to the external server and the process continues at step 306.

If, at Step 306, BMCM 112 establishes that the user's computing device is not connected to the Internet, BMCM 112 may first determine, at Step 308, whether the proposed action can be processed without Internet access. If it cannot be processed, the BMCM may store the file and the defined parameters at Step 310 until the computer is again connected to the Internet, at which time the process may restart at Step 314. If the action may be processed without Internet access, at Step 312, BMCM 112 processes the files. The user may then open or otherwise access the file at Step 320.

Figure 4:
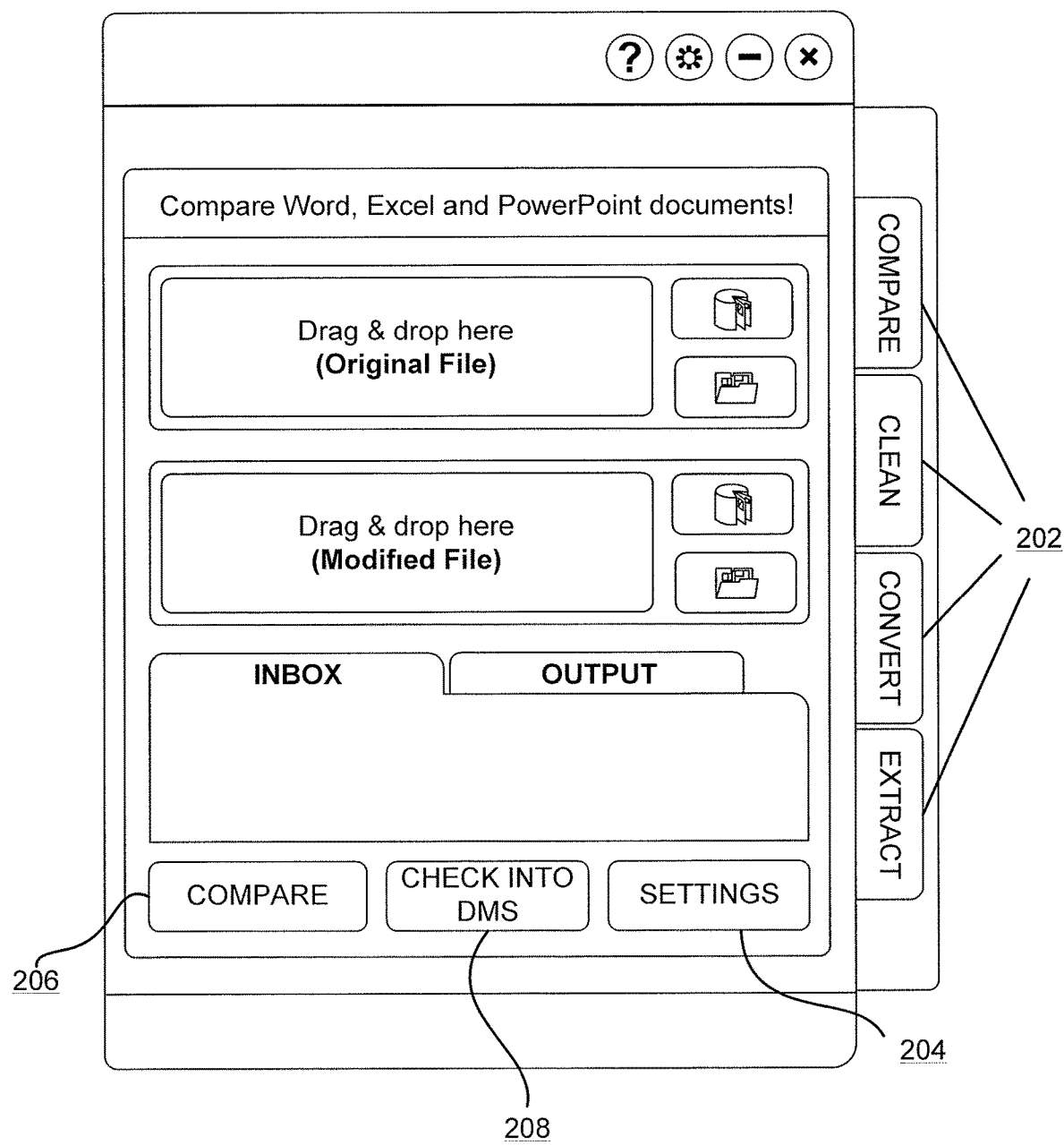
FIG. 4 is an exemplary interface for a bidirectional multi-functional communication module, consistent with disclosed embodiments.

FIG. 4 is an exemplary interface 400 for a bidirectional multi-functional communication module, consistent with disclosed embodiments. BMCM 112 may use an interface, such as interface 400, to receive requests from a user. For example, as shown in FIG. 4, a user may select from several applications 202 offering operations to perform on electronic files, such as comparing the files, cleaning metadata from the files, converting the files, or extracting information from the files. Once an application is chosen, a user may use interface 400 to select the files on which an operation is to be performed. A user may also use interface 400 to determine how to receive the result of the operation. For example, a user may receive the result of the operation via a download link, via e-mail, or from the interface itself. Setting preferences may also be available to a user via interface 400. For example, if a user chooses a compare operation, the user may wish to have inserted text shown in green and deleted text shown in purple. BMCM 112 may receive the data representing these user selections through interface 400 and communicate them to BiS component 212.

The above-described devices and subsystems of disclosed embodiments can include, for example, any suitable servers, workstations, PCs, laptop computers, PDAs, Internet appliances, handheld devices, cellular telephones, wireless devices, or other devices capable of performing the processes of the exemplary embodiments.

All or a portion of the devices and subsystems of the exemplary embodiments may be implemented using one or more general purpose computer systems, microprocessors, digital signal processors, micro-controllers, and the like, programmed according to the teachings of exemplary embodiments, as will be appreciated by those of ordinary skill in the computer and software arts. To implement such an embodiment as well as other embodiments, a single computer system may be programmed to perform the special purpose functions of one or more of the devices and subsystems of the disclosed embodiments. On the other hand, two or more programmed computer systems or devices may be substituted for any one of the devices and subsystems of the exemplary embodiments. Accordingly, principles and advantages of distributed processing, such as redundancy, replication, and the like, increase the robustness and performance of the devices and subsystems of the exemplary embodiments.

The devices and subsystems of the exemplary embodiments can communicate with each other using any suitable protocol and can be implemented using one or more programmed computer systems or devices. One or more communication mechanisms may be used with disclosed embodiments, including, but not limited to, Internet access, telecommunications in any suitable form (e.g., voice, modem, and the like), and wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, or a combination thereof.

Appropriate software may be prepared by programmers of ordinary skill based on the teachings of the exemplary embodiments. Further, the devices and subsystems of the exemplary embodiments can be implemented on the World Wide Web. In addition, the devices and subsystems of exemplary embodiments may be implemented by the preparation of application-specific integrated circuits or by interconnecting an appropriate network of conventional component circuits, as will be appreciated by those skilled in the electrical art. Thus, the exemplary embodiments are not limited to any specific combination of hardware circuitry and/or software.

Stored on any one or on a combination of solid, tangible computer readable media, disclosed embodiments may include instructions programmed according to the disclosed teachings for controlling the devices and subsystems of embodiments, for driving the devices and subsystems of embodiments, and for enabling the devices and subsystems of embodiments to interact with a user. Such software may include, but is not limited to, device drivers, firmware, operating systems, development tools, applications software, and the like. Software implementing exemplary embodiments may include any suitable interpretable or executable code mechanism, including but not limited to scripts, interpretable programs, dynamic link libraries (DLLs), Java classes and applets, complete executable programs, and Common Object Request Broker Architecture (CORBA) objects implemented using a variety of programming languages, such as Java, C, C++, JavaScript, or any other now known or later created programming language. Moreover, parts of the processing of the exemplary embodiments can be distributed for better performance, reliability, and cost. The described implementation includes software, but the disclosed embodiments may be implemented as a combination of hardware and software.

In addition to the stored instructions programmed according to the disclosed teachings devices and systems of disclosed embodiments may include computer readable media for storing information relating to various processes described herein using data structures, tables, records, and/or other data described herein. Computer readable media can include any suitable medium that participates in providing instructions to a processor for execution. Such a medium may take many forms, including but not limited to, non-volatile media, volatile media, transmission media, and the like. Non-volatile media can include, for example, hard disks, optical or magnetic disks, magneto-optical disks, floppy disks, CD-ROM and the like. Volatile media can include dynamic memories, and the like. Transmission media can include coaxial cables, copper wire, fiber optics, and the like. Common forms of computer-readable media can include, for example, a floppy disk, a flexible disk, hard disk, magnetic tape, any other suitable magnetic medium, a CD-ROM, CDRW, DVD, SD cards, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, or any other suitable medium from which a computer can read.

One or more databases of the devices and subsystems of the disclosed embodiments may store the information used to implement the disclosed embodiments. The databases may be organized using data structures (e.g., records, tables, arrays, fields, graphs, trees, lists, and the like) included in one or more memories or storage devices listed herein. The processes described with respect to disclosed embodiments may include appropriate data structures for storing data collected and/or generated by the processes of the devices and subsystems of the disclosed embodiments in one or more databases thereof.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. It is intended that the specification and examples be considered as exemplary only, with the true scope and spirit being indicated by the following claims.

What is claimed is:

1. A server for performing an operation on a file, comprising:
   a connection to a bidirectional Internet communication layer providing for bidirectional communication between the server and a remote device; and
   at least one processor configured to perform the operation on the file, the processor configured to perform operations comprising:
   receiving, via the bidirectional Internet communication layer from the remote device, a request to perform the operation on the file, the request comprising the file, an identification of the operation, and information used to authenticate the request, wherein the operation is associated with litigation document support software executed by the at least one processor;
   generating a second file by performing the identified operation on the received file;
   creating a response comprising the second file; and
   sending the response via the bidirectional Internet communication layer to the remote device.

2. The server of claim 1, wherein the remote device in bidirectional communication with the server comprises a smart phone.

3. The server of claim 1, wherein the operation is associated with PDF manipulation software executed by the at least one processor.

4. The server of claim 1, wherein the received request includes a preference associated with the identified operation.

5. A system for performing an operation on a file, comprising:
   an external server connected to a bidirectional Internet communication layer; and
   a computing device comprising at least one processor configured to perform functions comprising:
   providing a user interface on a display of the computing device, the user interface providing options to select a first file and identify the operation;
   providing, to the external server via the bidirectional Internet communication layer, a request comprising the identified operation, the file, and information used to authenticate the request,
      wherein the external server executes an application that, in response to the request, performs the identified operation and generates a response comprising a modified file as a result of the performed operation, and
      wherein the operation is associated with litigation document support software executed by the external server; and
   receiving the response comprising the modified file from the external server via the bidirectional Internet communication layer.

6. The system of claim 5, wherein the computing device comprises a smart phone.

7. The system of claim 5, wherein the operation is associated with PDF manipulation software executed by the external server.

8. The system of claim 5, wherein the provided request includes a preference associated with the identified operation.

9. A non-transitory computer readable medium storing instructions that cause a processor of a server connected to a bidirectional Internet communication layer to perform operations comprising:
   receiving, via the bidirectional Internet communication layer from a remote device, a request to perform an operation on a file, the request comprising the file, an identification of the operation, and information used to authenticate the request, wherein the operation is associated with litigation document support software executed by the processor;
   performing the identified operation on the received file;
   creating a response comprising a second file, wherein the second file comprises the first file modified by the performed operation; and
   sending the response via the bidirectional Internet communication layer to the remote device.

10. The non-transitory computer readable medium of claim 9, wherein the remote device in bidirectional communication with the server comprises a smart phone.

11. The non-transitory computer readable medium of claim 9, wherein the operation is associated with PDF manipulation software executed by the at least one processor.

12. The non-transitory computer readable medium of claim 9, wherein the received request includes a preference associated with the identified operation.

* * * * *